(12) United States Patent
Rajendran Pillai Sarojini et al.

(10) Patent No.: US 10,462,261 B2
(45) Date of Patent: Oct. 29, 2019

(54) SYSTEM AND METHOD FOR CONFIGURING A DATA ACCESS SYSTEM

(71) Applicant: YOKOGAWA ELECTRIC CORPORATION, Musashino-shi, Tokyo (JP)

(72) Inventors: Muralee Krishnan Rajendran Pillai Sarojini, Singapore (SG); Mark Anthony De Castro Cu-Unjieng, Singapore (SG); Haydee Lavisores Plenos, Singapore (SG)

(73) Assignee: Yokogawa Electric Corporation, Tokyo (JP)

( * ) Notice: Subject to any disclaimer, the term of this patent is extended or adjusted under 35 U.S.C. 154(b) by 242 days.

(21) Appl. No.: 14/748,887

(22) Filed: Jun. 24, 2015

(65) Prior Publication Data

US 2016/0380816 A1 Dec. 29, 2016

(51) Int. Cl.
*H04L 12/24* (2006.01)
*H04L 29/08* (2006.01)

(52) U.S. Cl.
CPC .......... *H04L 67/34* (2013.01); *H04L 41/0866* (2013.01); *H04L 41/0823* (2013.01); *H04L 67/12* (2013.01)

(58) Field of Classification Search
CPC . H04L 67/12; H04L 41/0803; H04L 41/0823; H04L 41/084; H04L 41/0866; G05B 19/18; G05B 19/418; G05B 23/00; G05B 19/41885; G05F 8/34; G06F 8/60
See application file for complete search history.

(56) References Cited

U.S. PATENT DOCUMENTS

| 2006/0206866 | A1* | 9/2006 | Eldrige | G05B 15/02 717/122 |
| 2006/0224361 | A1* | 10/2006 | McIntyre | G05B 23/0216 702/183 |
| 2006/0259515 | A1* | 11/2006 | Weinrich | G05B 19/418 |
| 2012/0303150 | A1* | 11/2012 | Krishnaswamy | G05B 17/02 700/110 |
| 2013/0124465 | A1* | 5/2013 | Pingel | G06F 3/0604 707/610 |
| 2016/0147206 | A1* | 5/2016 | Neitzel | G05B 15/02 700/20 |

* cited by examiner

*Primary Examiner* — Tom Y Chang
(74) *Attorney, Agent, or Firm* — Sughrue Mion, PLLC

(57) ABSTRACT

A data access configuration system includes, not limited to, a configuration tool, a configuration library, a plurality of configuration files, a data server and an acquisition engine. The configuration library is configured to communicate with the configuration tool. The configuration library includes, not limited to, a plurality of configuration Application Programming Interfaces (APIs). The plurality of configuration files are generated by the APIs. The data server includes, not limited to, a data server configuration module. The acquisition engine includes, not limited to, an acquisition engine configuration module. The acquisition engine is configured to communicate with at least one data source, the at least one data source is configured to communicate with a plurality of field devices to retrieve data. The configuration library is configured to manage the data server configuration module and the acquisition engine configuration module.

9 Claims, 8 Drawing Sheets

SYSTEM AND METHOD FOR CONFIGURING A DATA ACCESS SYSTEM

TECHNICAL FIELD

The disclosure relates to a configuration system and a data access system in an industrial plant.

BACKGROUND

OPC Unified Architecture is a platform-independent standard through which various kinds of systems and devices can communicate by sending messages between clients and servers over various types of networks. OPC is an acronym for "OLE (Object Linking and Embedding) for Process Control". OPC UA supports robust, secure communication that assures the identity of clients and servers and resists attacks. OPC UA defines sets of services that servers may provide, and individual servers specify to clients what service sets they support. Information is conveyed using OPC UA-defined and vendor-defined data types, and servers define object models that clients can dynamically discover. Servers can provide access to both real-time and historical data to notify clients of important changes. OPC UA can be mapped onto a variety of communication protocols and data can be encoded in various ways to trade off portability and efficiency.

OPC UA provides a consistent, integrated address space and service model. This allows a single OPC UA server to integrate real-time data and historical data into its address space, and to provide access to them using an integrated set of services. These services also include an integrated security model.

In a typical industrial plant using the OPC UA to retrieve and store real-time data from field devices, the data is used to monitor and control processes in that industrial plant. An example of a system 100 is shown in FIG. 1. At least one client 102 is connected to a data server 110. The data server 110 includes, not limited to, modules—a plurality of services 112 to communicate with client 102, and an address space 114.

SUMMARY

A data access configuration system includes, not limited to, a configuration tool, a configuration library, a plurality of configuration files, a data server and an acquisition engine. The configuration library is configured to communicate with the configuration tool. The configuration library includes, not limited to, a plurality of configuration Application Programming Interfaces (APIs). The plurality of configuration files are generated by the APIs. The data server includes, not limited to, a plurality of configuration methods and a data server configuration module. The acquisition engine includes, not limited to, an acquisition engine configuration module. The acquisition engine is configured to communicate with at least one data source, the at least one data source is configured to communicate with a plurality of field devices to retrieve data. The configuration library is configured to manage the data server configuration module and the acquisition engine configuration module. The configuration tool, the configuration library, the data server, and the acquisition engine are implemented in one or more processors.

DETAILED DESCRIPTION

Figure 1:
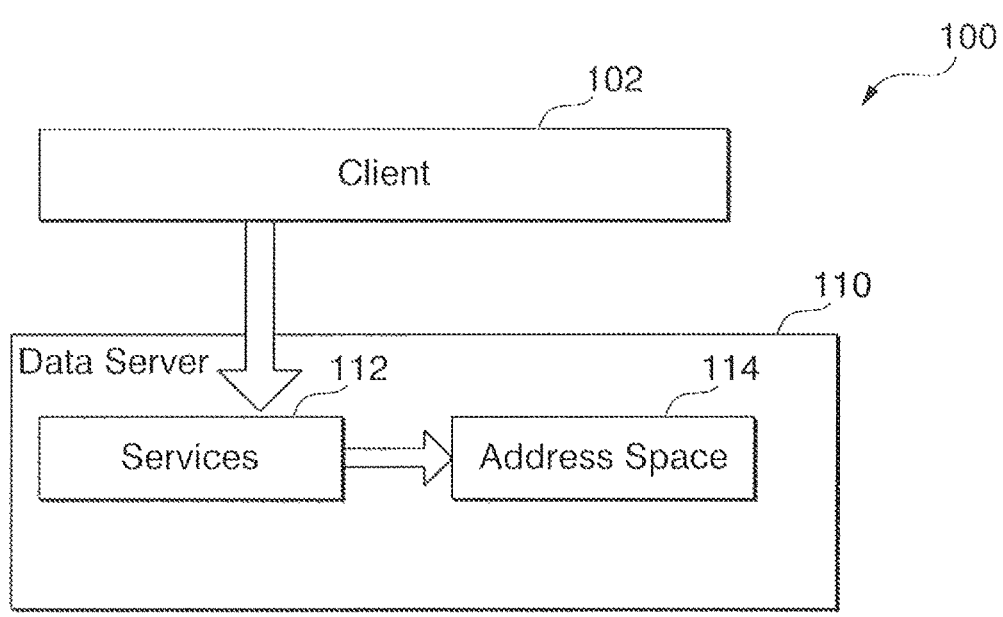
FIG. 1 is a block diagram of data access system in a related art.

Reference will now be made in detail to the preferred embodiments of the invention, examples of which are illustrated in the accompanying drawings. While some aspects of the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details.

Certain terms are defined below for purpose of describing some embodiments of the present invention.

"Application Programming Interface (API)" includes, but not limited to, at least one set of programming codes which includes definitions to enable communication between at least a component and a tool in a system.

"Data" is a general name of such as, not limited to, scalar, text, binary chuck, structured data and table. Examples of "Data" may include, but are not limited to, process data from processes in an industrial plant, data from field devices, application data used in system tools of the industrial plant.

"Address space" is a collection of information. The information can be provided on a user interface. An example is the information being provided in a tree diagram on a user interface. The tree diagram is a representation of a system. Each branch of the tree diagram is a "node", a fundamental component in an address space.

There are two types of the node. A first type of the node includes, but is not limited to, a physical entity of a system. Examples of a physical entity are a field device and a subsystem. A second type of node is a logical entity of a system. Examples of a logical entity are a method or a function.

In a computational resource for a system which includes an address space, a node is modelled as an object in object orientated programming. In a system which is compliant to the OPC UA protocol standards, the node is modelled as an object using OPC UA object model. A node includes an instance of a dynamic node in an execution environment.

"Component" and "Tool" each include, but not limited to, at least one set of programming codes to execute at least one function. The component or tool is implemented on at least one processor and has access to a memory storage.

"Configuration data" is defined as specific settings of a system component, function component for a system to be operational.

"Configuration function" is a step to prepare configuration data in a component or a system.

"Configuration tool" is defined to include, but not limited to, at least one set of programming codes to execute at least one configuration function. The configuration tool is implemented on at least one processor and has access to a memory storage.

"Configuration module" includes, not limited to, at least one routine to execute a configuration function.

Figure 2A:
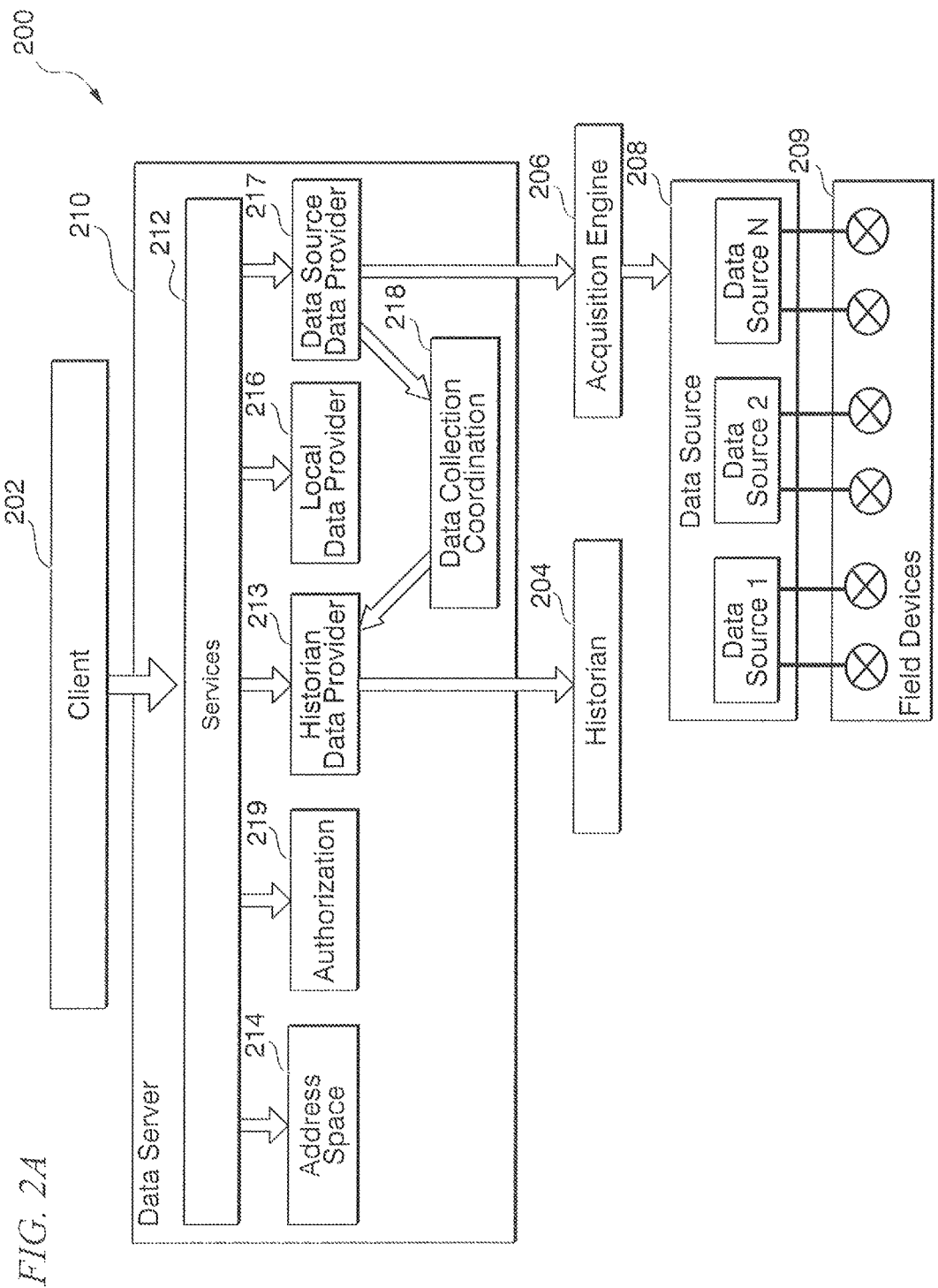
FIGS. 2A, 2B and 2C are block diagrams of a data access system according to some embodiments of the present invention.

A data access system 200 illustrated in FIG. 2A using the OPC UA standard includes, not limited to, at least a client 202 and a data server 210, a historian 204, an acquisition engine 206 and a data source 208. The data system 200 is configured to access data from field devices 209 in an industrial plant. The client 202, the data server 210, the acquisition engine 206 and the data source 208 are implemented in one or more processors. The historian 204 stores historical data which is archived data from the industrial plant. The archived data includes, not limited to, process data and data from field devices 209. The historian 204 is implemented in a memory storage which can be within or external to the one or more processors. The data source 208 provides real time data in the industrial plant. The real time data includes, not limited to, process data and data from the field devices 209.

The data server 210 includes, but not limited to, a plurality of services 212, an address space 214, a historian data provider 213, a local data provider 216, a data source data provider 217, a data collection coordination 218 and an authorization 219.

Each system component of the data access system 200 is implemented on at least one processor and includes a memory storage or has access to a memory storage according to some embodiments of the invention. Examples of the system components include, not limited to, the data server 210, the historian 204 and the acquisition engine 206. Examples of function components of the data server 210 include, not limited to, the historian data provider 213, the local data provider 216, the data source data provider 217, the data collection coordination 218 and the authorization 219.

The component of the address space 214 is defined to include, not limited to, data which the data server 210 makes visible to the at least one client 202. The component of the address space 214 includes a plurality of nodes and one or more parameters for each node. At least one parameter of each node defines a storage location for data of the node. The storage location is at least one of the historian 204, the data source 208 and a temporary storage, such as a cached memory storage in the data server 210.

The component of the authorization 219 is configured to determine if the services 212 receives the request for data access from a client 202 or from a user who has, in the request, access rights to data in the historian 204 or the data source 208.

The historian data provider 213, the local data provider 216, the data source data provider 217 and the data collection coordination 218 are intermediaries between the plurality of services 212 and the data in the historian 204 or the data source 208. The plurality of services 212 includes, not limited to, services to receive a request for data access from the client 202 or from a user who has access rights to the data; and services to determine which one of the local data provider 216 and the data source provider 217 is a data provider to access data in the request, based on an information included in or related to the request for data access. The plurality of services 212 identifies a node from which the request for the data is sent. The data server 210 includes a predefined mapping for each of the plurality of nodes in the address space to the data provider. The plurality of services 212 determine the data provider to access the data based on the predefined mapping. The predefined mapping is provided in a mapping table according to some embodiments of the invention.

The local data provider 216 manages static data, cached data and historical data. Static data includes, not limited to, variables, in the address space 214, which are not changed. Cached data are variables, in the address space 214, which the data server 210 caches or stores for a predefined period of time. Historical data are data which are configured to be stored in the historian 204. For example, a client 202 writes values to variables periodically and the most recent values are stored in a cache in the data server 210. The local data provider 216 reads the cached value when the local data provider 216 determines that a request for data access is to access a real-time variable.

The historian data provider 213 makes an access to the historian 204 to read, write and update historical data in the historian 204. For example, the data server 210 calls the historian data provider 213 to access historical data in the historian 204 when the data server 210 determines that a request for data access is to read, write or update historical data of a variable in the address space 214. The historian data provider 213 requests the historian 204 to complete the request for data access. In accordance with the request, the historian 204 does read, write or update historical data and then complete the request for data access.

The data source data provider 217 makes an access to at least one data source 208 through the acquisition engine 206, to browse, read or write data in the at least one data source 208. The data source 208 is external to the data server 210 according to some embodiments of the invention. For example, the data server 210 calls the data source data provider 217 to access data when the data server 210 determines that a request for data access is to browse, read or update a variable in the address space 214 and the variable represents at least one item in the data source 208. The data source data provider 217 requests the acquisition engine 206 to complete the request for data access. In accordance with the request, the acquisition engine 206 does browse, read, write or update data in the at least one data source 208 and then complete the request for data access.

Data Access Workflow

Figure 3:
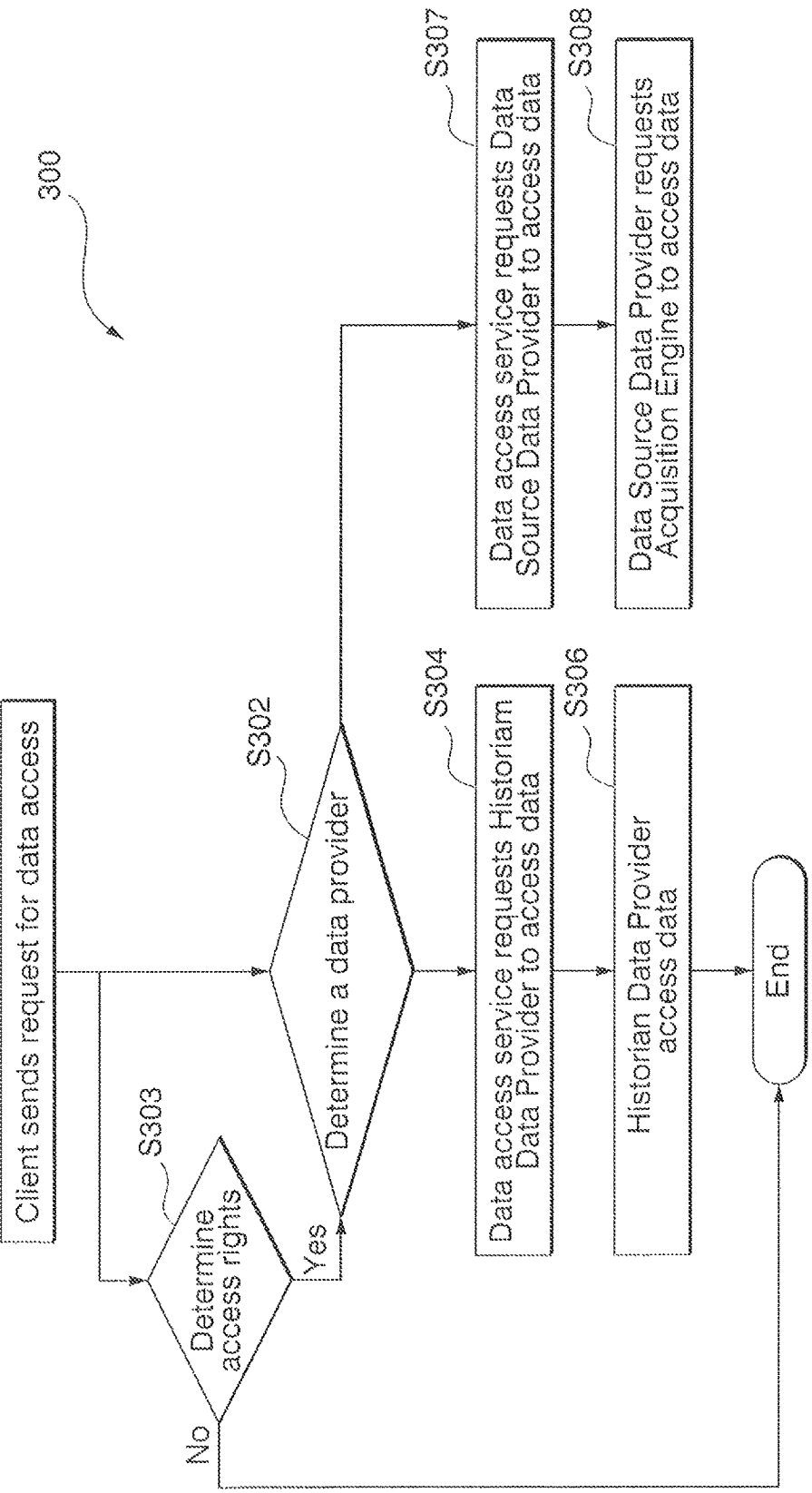
FIG. 3 is a workflow of a method for data access according to some embodiments of the present invention.

FIG. 3 illustrates a workflow 300 for data access according to some embodiments of the invention. In Step S301, the client 202 sends a request for data access to the data server 210. The request for data access is received from a user interface according to some embodiments of the invention, or generated automatically by other systems using a trigger or on a periodic basis according to some embodiments of the invention. The request is received by the data server 210 through the plurality of services 212. The plurality of services 212 includes a logic to identify a data access service to perform the received request.

In Step S302, the data access service identifies a target node in the address space 214 to determine if data in the request is in the target node. The data access service determines the data provider based on configuration data of the target node when the data in the request is not available in the target node. An example of data which is not available in the target node in the address space 214 is dynamic data. Dynamic data is a value of a variable in the address space 214, the value is in one of the data source 208 and the historian 204.

In Step S303, the data access service requests the authorization 219 to determine if the client 202 has access rights to the data in the request. This is an optional step according to some embodiments of the invention. The request for data access request is terminated when the client 202 is determined to have no access rights in S303.

In Step S304, the data access service requests the historian data provider 213 to complete the data access request when in step S302, the data provider determined is the historian data provider 213. In Step S306, the historian data provider 213 accesses the historian 204 to complete the data access request.

In Step S307, the data access service requests the data source data provider 217 to complete the data access request when in step S302, the data provider determined is the data source data provider 217. In Step S308, the data source data provider 217 requests the acquisition engine 206 to complete the data access request.

Data Access Configuration System

The components, data server 210, historian 204 and acquisition engine 206, may require different types of configuration data. For example, an address space 214 configuration data is required by the data server 210. Each of the data server 210, the historian 204 and the acquisition engine 206 requires various runtime parameters. Runtime parameters are parameters used during execution of functions such as data collection and data access.

Figure 2B:
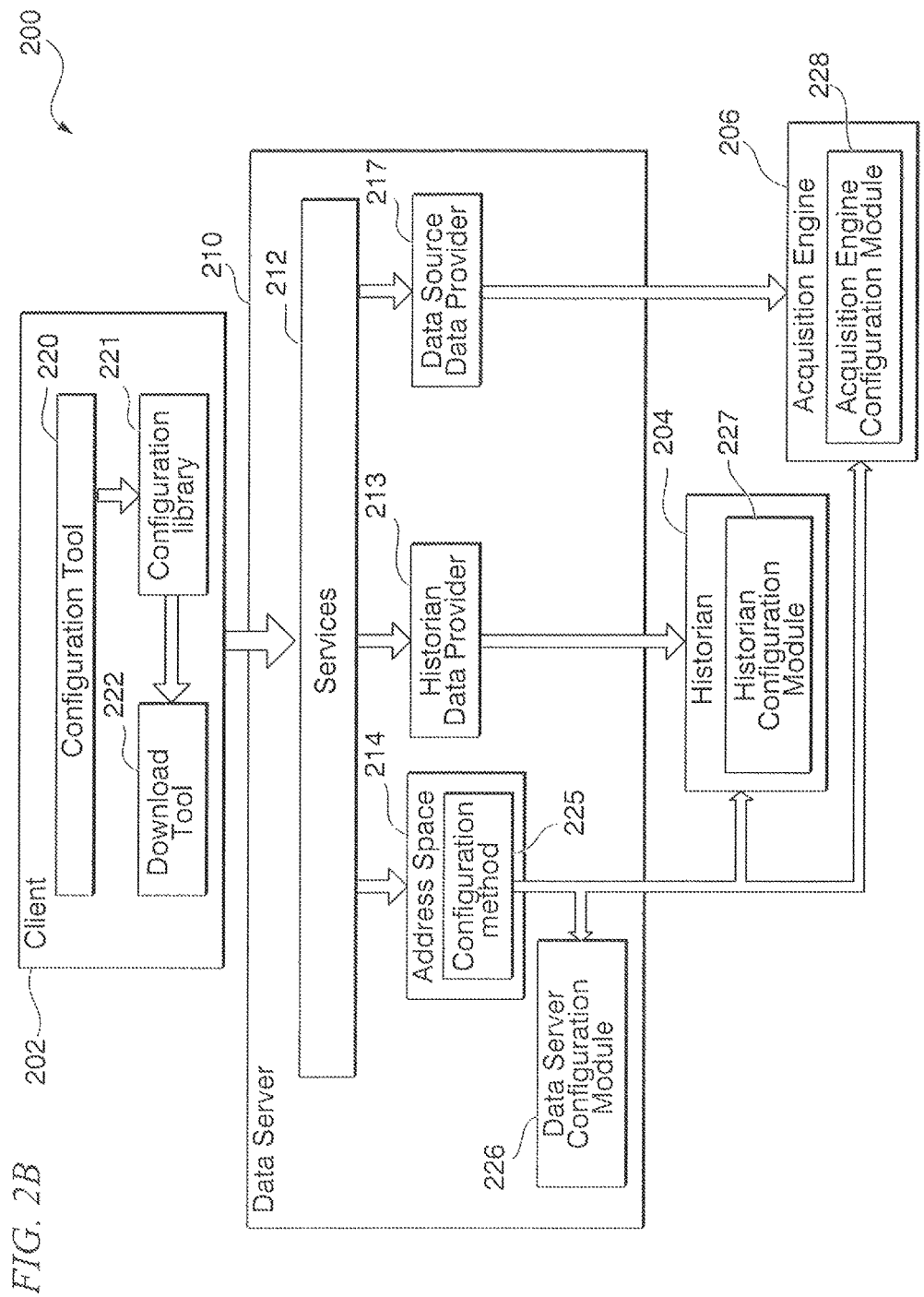
Figure 2C:
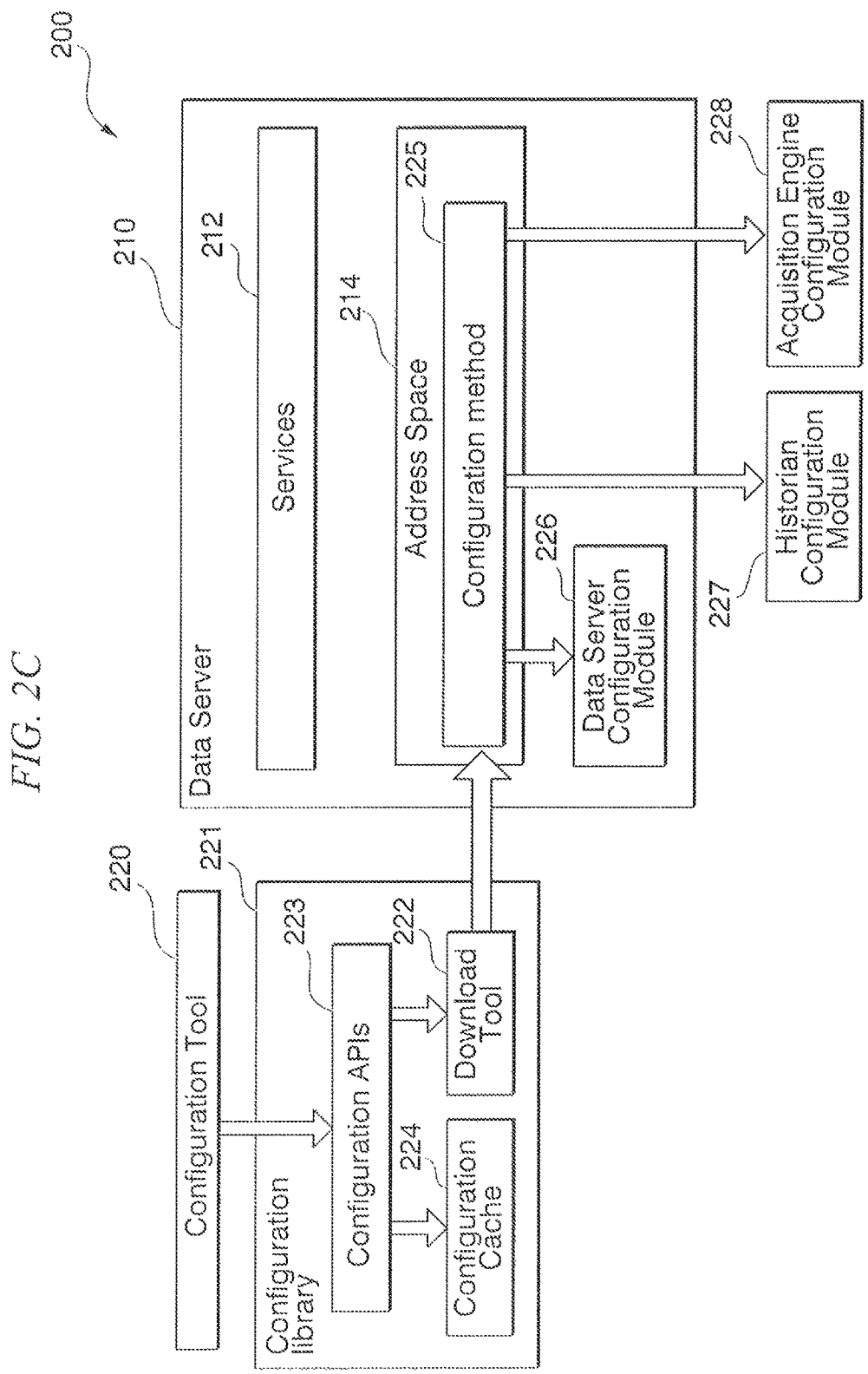

FIGS. 2B and 2C illustrates the data access system 200 with configuration components according to some embodiments of the invention. The configuration components include, not limited to, a configuration tool 220, a configuration library 221, a download tool 222, a plurality of configuration methods 225 in the address space 214, a data server 210, configuration module 226, a historian configuration module 227, an acquisition engine configuration module 228 and a plurality of configuration files.

The configuration library 221 includes, not limited to, a plurality of configuration APIs 223 which are used by the configuration tool 220. The plurality of configuration files are generated by the plurality of configuration APIs 223. The download tool 222 is part of or external to the configuration library 221. A configuration cache 224 is a storage for the plurality of configuration files.

Each of the plurality of configuration methods 225 is a node in the address space 214. Each configuration method 225 includes, not limited to customized parameters and at least one predefined service from the plurality of services 212. Each configuration method 225 is configured to identify at least one of the data server 210, historian 204 and acquisition engine 206, which is relevant for the plurality of configuration files. The configuration library 221 utilizes the plurality of configuration methods 225 to manage transactions when the configuration tool 220 configures at least one of the data server 210, the historian 204 and the acquisition engine 206. The data server 210 includes, not limited to, the data server configuration module 226. The historian 204 includes, not limited to, the historian configuration module 227. The acquisition engine 206 includes, not limited to, the acquisition engine configuration module 228.

Each of the data server 210, historian 204 and acquisition engine 206 has a configuration module. Each of the data server configuration module 226, the historian configuration module 227 and the acquisition engine configuration module 228 processes configuration functions as controlled by the configuration library 221.

Data Access Configuration Workflow

Figure 4A:
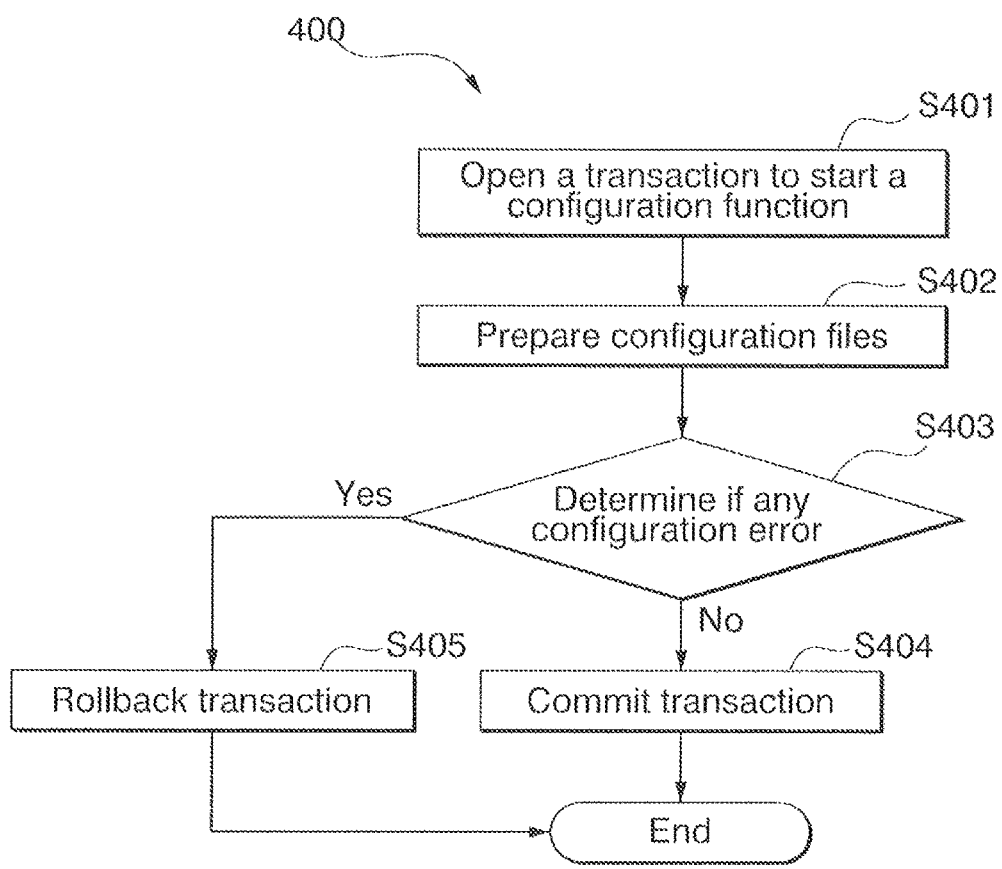
FIGS. 4A and 4B are workflows of methods to configure data access system according to some embodiments of the present invention.

FIG. 4A illustrates an example configuration workflow 400 according to some embodiments of the invention. In Step S401, the configuration library 221, the data server configuration module 226, the historian configuration module 227 and the acquisition engine configuration module 228 opens a transaction to start a configuration function. The configuration library 221 acts as a main transaction manager and the data server configuration module 226, the historian configuration module 227 and the acquisition engine configuration module 228 are participants. Each of the data server configuration module 226, the historian configuration module 227 and the acquisition engine configuration module 228 acts as a subordinate. Only one open transaction is allowed in the system 200 at a time. No new transaction can be opened when there is one open transaction.

In Step S402, the plurality of configuration files are being prepared when the data access functions are performed during runtime of the system 200. The runtime of the system 200 is not affected during the preparation. The preparation includes, not limited to, validate and update data in the configuration files.

In Step S403, the data server configuration module 226, the historian configuration module 227 and the acquisition engine configuration module 228 determine if there any configuration error and notify the configuration library 221 of the determination. Configuration error includes, not limited to validation error.

In Step S404, the configuration library 221, the data server configuration module 226, the historian configuration module 227 and the acquisition engine configuration module 228 commit the transaction to the runtime data of the system 200 when there is no configuration error. The transaction is closed when the commit is successful. The commit is repeated when it is not successful. A user intervenes the commit when it is not successful according to some embodiments of the invention.

In Step S405, the configuration library 221 issues a rollback when the configuration library 221 is notified of one or more configuration error. The transaction is cancelled and closed.

Figure 4B:
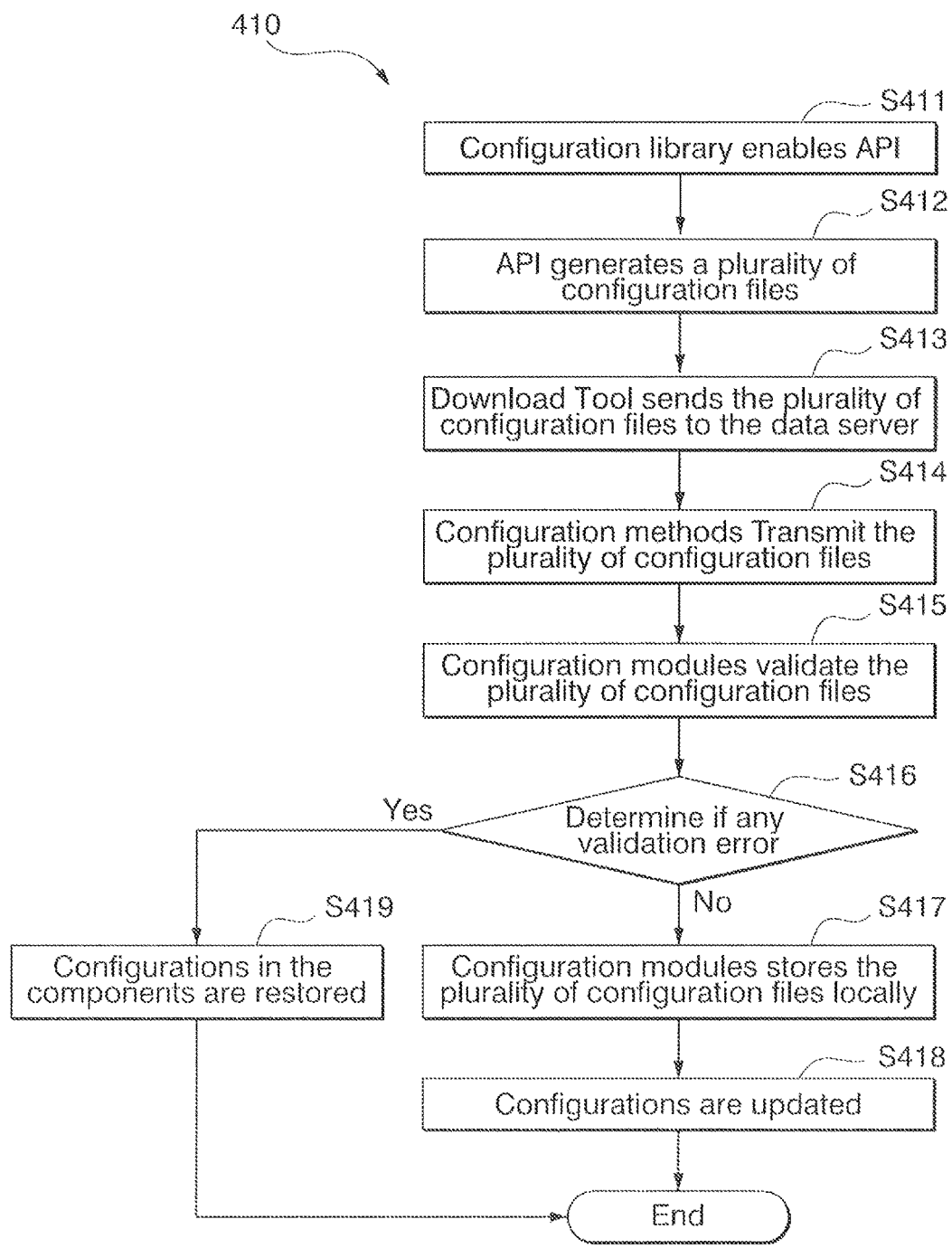

FIG. 4B illustrates an example configuration workflow 410 according to some embodiments of the invention. In Step S411, the configuration library 221 enables the configuration APIs 223 when the configuration tool 220 sends a request to configure the system 200. The configuration APIs 223 check that a user has rights to perform configuration function and allow the user to perform the configuration function.

In Step S412, the configuration APIs 223 generate data for the plurality of configuration files. The data in the plurality of configuration files include, not limited to a node in the address space 214. Examples of data are structure for address space 214, security, history of nodes and scan rate information for data collection. The data in the plurality of configuration files include connection details for the data server 210, the historian 204 and the acquisition engine 206. An example type of a configuration file is an Extensible Markup Language (XML).

In Step S413, the plurality of configuration files are stored in the configuration cache 224 and the download tool 222 downloads the plurality of configuration files to the data server 210.

In Step S414, the configuration library 221 utilize the configuration methods 225 to perform the configuration function. The configuration methods 225 transmit the configuration files and configuration functions to the data server configuration module 226, the historian configuration module 227 and the acquisition engine configuration module 228. The configuration library 221 use the plurality of services 212 to support the transmission from the configuration methods 225 to the data server configuration module 226, the historian configuration module 227 and the acquisition engine configuration module 228. The configuration methods 225 validate the plurality of configuration files before transmitting to the data server configuration module 226, the historian configuration module 227 and the acquisition engine configuration module 228 according to some embodiments of the invention.

In Step S415, the data server configuration module 226, the historian configuration module 227 and the acquisition engine configuration module 228 validate the plurality of configuration files.

In Step S416, the data server configuration module 226, the historian configuration module 227 and the acquisition engine configuration module 228 notify the configuration library 221 of the validation result, if there is one or more validation error.

In Step S417, the configuration library 221 notifies the data server configuration module 226, the historian configuration module 227 and the acquisition engine configuration module 228 to continue with the configuration function when there is no validation error.

The data server configuration module 226, the historian configuration module 227 and the acquisition engine configuration module 228 store the configuration files locally to the respective data server 210, the historian 204 and the acquisition engine 206.

In Step S418, the data server configuration module 226, the historian configuration module 227 and the acquisition engine configuration module 228 update data in the configuration files to configurations of the respective data server 210, the historian 204 and the acquisition engine 206. The data in the plurality of configuration files are then applicable to runtime data in the data server 210, the historian 204 and the acquisition engine 206.

In Step S419, the configuration library 221 notifies the data server configuration module 226, the historian configuration module 227 and the acquisition engine configuration module 228 to terminate the configuration function. The data server configuration module 226, the historian configuration module 227 and the acquisition engine configuration module 228 restore configuration in the data server 210, the historian 204 and the acquisition engine 206 to a previous version before start of the configuration function.

An example of implementation in a data access system 200 according to some embodiments of the invention is described, the data access system 200 uses OPC UA standard. An OPC UA client 202 includes, not limited to a configuration tool 220 and a configuration library 221. The configuration library 221 includes, not limited to, a plurality of configuration APIs 223, a configuration cache 224 and a download tool 222. The system 200 includes a data server 210, a historian 204 and an acquisition engine 206. The data server 210 is configured to be compliant to the OPC UA standard protocol. The historian 204 is configured to be compliant to OPC Historical Data Access (OPC HDA) standard protocol. The acquisition engine 206 is configured to perform data access function from a data source 208. The data source is configured to be compliant to OPC Data Access (OPC DA) standard protocol. An example of the data source 208 is a distributed control system (DCS). The data source 208 reads data from field devices 209 in an industrial plant. The data server 210 includes, not limited to, a plurality of OPC UA services 212, an OPC UA address space 214 and a data server configuration module 226. The OPC UA address space 214 includes a plurality of configuration methods 225.

A request to configure the system 200 is initiated automatically or manually by a user in the OPC UA client 202. The request is initiated in the configuration tool 220. The configuration library 221 enables the configuration APIs 223 when the configuration tool 220 starts to perform configuration function. The configuration APIs 223 check that the request is authentic, that the user has rights to perform the configuration function and the configuration function can start.

The configuration APIs 223 generates data for the plurality of configuration files. The plurality of configuration files are in XML format. The plurality of configuration files are stored in the configuration cache 224 and the download tool 222 downloads the plurality of configuration files to the OPC data server 210.

The configuration library 221 utilizes the configuration methods 225 to perform the configuration function. The configuration methods 225 transmit the configuration files and configuration functions to the data server configuration module 226, the historian configuration module 227 and the acquisition engine configuration module 228. The configuration library 221 uses the plurality of services 212 to support the transmission from the configuration methods 225 to the data server configuration module 226, the historian configuration module 227 and the acquisition engine configuration module 228.

The data server configuration module 226, the historian configuration module 227 and the acquisition engine configuration module 228 validate the plurality of configuration files. The data server configuration module 226, the historian configuration module 227 and the acquisition engine configuration module 228 notify the configuration library 221 of the validation result, if there is one or more validation errors.

The configuration library 221 notifies the data server configuration module 226, the historian configuration module 227 and the acquisition engine configuration module 228 to continue with the configuration function when there is no validation error. The data server configuration module 226, the historian configuration module 227 and the acquisition engine configuration module 228 store the configuration files locally to the respective data server 210, the historian 204 and the acquisition engine 206.

The data server configuration module 226, the historian configuration module 227 and the acquisition engine configuration module 228 update data in the configuration files to configurations of the respective data server 210, the historian 204 and the acquisition engine 206. The data in the plurality of configuration files are then applicable to runtime data in the data server 210, the historian 204 and the acquisition engine 206.

The configuration library 221 notifies the data server configuration module 226, the historian configuration module 227 and the acquisition engine configuration module 228 to terminate the configuration function. The data server configuration module 226, the historian configuration module 227 and the acquisition engine configuration module 228 restore configuration in the data server 210, the historian 204 and the acquisition engine 206 to a previous version before start of the configuration function.

Advantageously, some embodiments of the present invention can improve the configuration workflow of a data access system. The configuration APIs 223 enables the plurality of configuration files to be streamlined when the configuration files are downloaded to the data access system 200. The configuration APIs 223 in the configuration library 221 is reusable to configure any system component. Less manpower effort is required to configure a data access system and the efficiency of the configuration function is improved.

Figure 5:
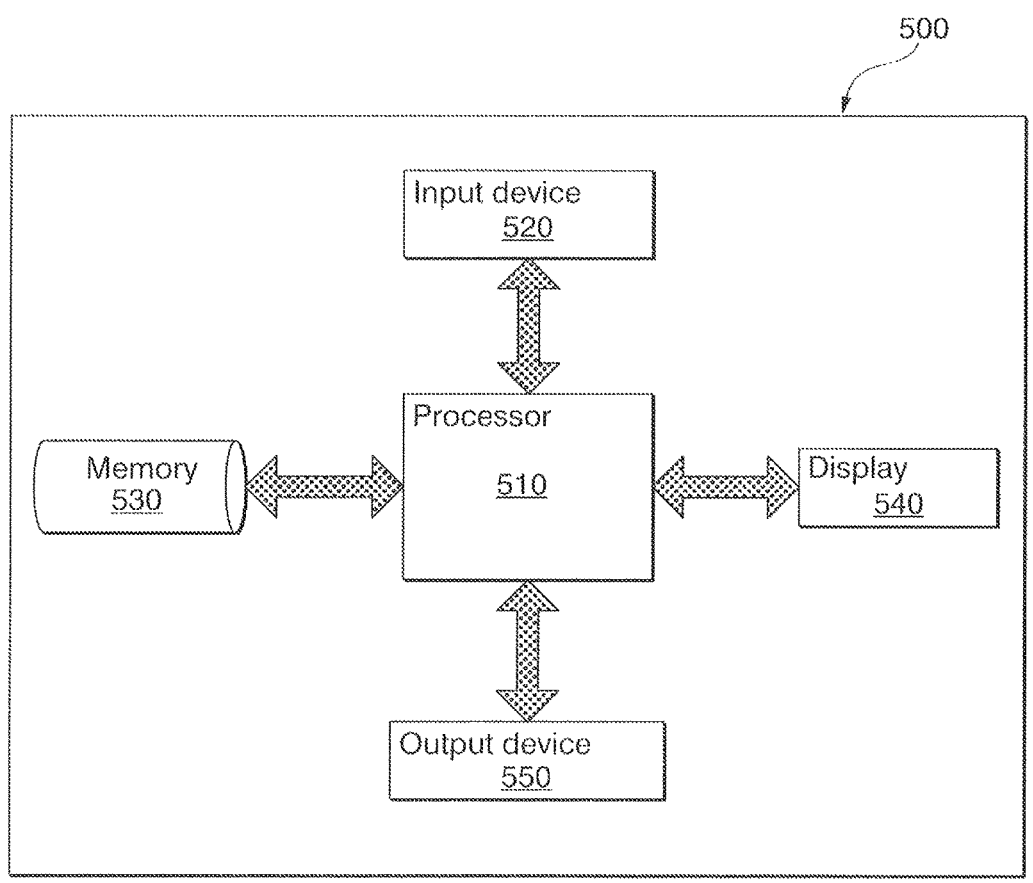
FIG. 5 is a block diagram for a data access system according to some embodiments of the present invention.

FIG. 5 is a block diagram for a data access system 500 of the present invention. The data access system 500 includes a processor 510 which is part of a computer. The processor 500 communicates with input device 520, storage 530, display 540 and output or transmission device 550. The input device 520, storage 530, display 540, output or transmission device 550 are in the same or separate computer as the processor according to some embodiments of the invention.

The client 202, the data server 210, the historian 204, the acquisition engine 206 and the data source 208 are implemented in one or more processors 510.

Input device 520 is an interface device to receive user input, input import from alternative source or third parties. Examples of input device 520 are keyboard, pointing device such as a mouse and touch-sensitive display interface.

Historian 204 is in a storage or repository 530 being a memory storage medium such as Random Access Memory, Read Only Memory or Hard Disk Drive. The memory storage medium stores the configuration library 221, the configuration cache 224, the plurality of services 212, the address space 214 and the configuration methods 225.

A data access configuration system includes, not limited to, a configuration tool, a configuration library, a plurality of configuration files, a data server and an acquisition engine. The configuration library is configured to communicate with the configuration tool. The configuration library includes, not limited to, a plurality of configuration Application Programming Interfaces (APIs). The plurality of configuration files are generated by the APIs. The data server includes, not limited to, a plurality of configuration methods and a data server configuration module. The acquisition engine includes, not limited to, an acquisition engine configuration module. The acquisition engine is configured to communicate with at least one data source, the at least one data source is configured to communicate with a plurality of field devices to retrieve data. The configuration library is configured to manage the data server configuration module and the acquisition engine configuration module. The configuration tool, the configuration library, the data server, and the acquisition engine are implemented in one or more processors.

The data access configuration system includes, not limited to, a historian. The historian includes, not limited to, a historian configuration module. The configuration library is configured to manage the historian configuration module.

The data server further includes, not limited to, an address space. The plurality of configuration methods are in the address space.

The configuration library further includes, not limited to, a download tool to transmit the plurality of configuration files to the data server.

The configuration library further comprises configuration cache to store the plurality of configuration files.

A data access system is configured to perform a configuration function. The data access system includes, not limited to, a configuration tool, a configuration library, a plurality of configuration methods, a data server configuration module and an acquisition engine configuration module. The configuration tool is configured to open a transaction to start the configuration function. The configuration library is configured to prepare a plurality of configuration files. The plurality of configuration methods, in a data server, is configured to determine if there is at least one configuration error in the plurality of configuration files. The data server configuration module, in the data server, is configured to determine if there is at least one configuration error in the plurality of configuration files. The acquisition engine configuration module, in an acquisition engine, is configured to determine if there is at least one configuration error in the plurality of configuration files. The configuration library is configured to manage the data server configuration module and the acquisition engine configuration module to complete the configuration function in the data server and the acquisition engine when at least one of the plurality of configuration methods, the data server configuration module and the acquisition engine configuration module determines that there is no error in the plurality of configuration files.

The configuration library is configured to manage the data server configuration module and the acquisition engine configuration module to terminate the configuration function in the data server and the acquisition engine when at least one of the plurality of configuration methods, the data server configuration module and the acquisition engine configuration module determines there is at least one configuration error in the plurality of configuration files.

The configuration library is configured to enable a plurality of configuration APIs in the configuration library. The configuration APIs is configured to generate the plurality of configuration files.

The data access system further includes, not limited to, a download tool and a configuration cache. The download tool, in the configuration library, is configured to send the plurality of configuration files to the data server. The configuration cache, in the configuration library, is configured to store the plurality of configuration files.

The data access system further includes, not limited to, a historian configuration module. The historian configuration module, in a historian, is configured to determine if there is at least one configuration error in the plurality of configuration files. The configuration library is configured to manage the historian configuration module to complete the configuration function in the data server, the acquisition engine and the historian when at least one of the plurality of configuration methods, the data server configuration module, the acquisition engine configuration module and the historian configuration module determine that there is no error in the plurality of configuration files.

The configuration library is configured to manage the historian configuration module to terminate the configuration function in the data server and the acquisition engine when at least one of the plurality of configuration methods, the data server configuration module, the acquisition engine configuration module and the historian configuration module determine there is at least one configuration error in the plurality of configuration files.

The data access system further includes, not limited to, a data server configuration module. The data server configuration module is configured to store the plurality of configuration files to the data server. The acquisition engine configuration module is configured to store the plurality of configuration files to the acquisition engine.

The historian configuration module is configured to store the plurality of configuration files to the historian.

A non-transitory computer readable storage medium that stores a set of a computer program to be executed by a computing system and a resource to be used by the computer program. The set of the computer program and the resource includes, not limited to, a configuration tool, a configuration library, a plurality of configuration methods, a data server configuration module and an acquisition engine configuration module. The configuration tool for opening a transaction to start a configuration function. The configuration library includes, not limited to, a plurality of Application Programming Interfaces (APIs) for preparing a plurality of configuration files. The plurality of configuration methods for determining if there is at least one configuration error in the plurality of configuration files. The data server configuration module for determining if there is at least one configuration error in the plurality of configuration files. The acquisition engine configuration module for determining if there is at least one configuration error in the plurality of configuration files. The configuration library being for managing the data server configuration module and the acquisition engine configuration module to complete the configuration function when at least one of the plurality of configuration methods, the data server configuration module and the acquisition engine configuration module determines that there is no error in the plurality of configuration files.

The configuration function includes, not limited to, the configuration library configured to manage the data server configuration module and the acquisition engine configuration module to terminate the configuration function when at least one of the plurality of configuration methods, the data server configuration module and the acquisition engine configuration module determines that there is at least one configuration error in the plurality of configuration files.

The configuration function includes, not limited to, a historian configuration module configured to determine if there is at least one configuration error in the plurality of configuration files. The configuration library is configured to manage the historian configuration module to complete the configuration function when at least one of the plurality of configuration methods, the data server configuration module, the acquisition engine configuration module and the historian configuration module determine that there is no error in the plurality of configuration files.

The configuration function includes, not limited to, the configuration library is configured to manage the historian configuration module to terminate the configuration function when at least one of the plurality of configuration methods, the data server configuration module, the acquisition engine configuration module and the historian configuration module determines that there is at least one configuration error in the plurality of configuration files.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A system comprising:
a plurality of field devices in an industrial plant;
one or more OPC Data Access (OPC DA) data sources communicatively coupled to the plurality of field devices, the one or more OPC DA data source configured to read data from the plurality of field devices;
1) an OPC Unified Architecture (OPC UA) client computer as a main component of the system, the OPC UA client computer comprising:
at least one memory configured to store computer program code; and
at least one processor configured to access the at least one memory and operate according to the computer program code, said computer program code including:
1-1) configuration tool code;
1-2) configuration library code configured to cause at least one of the at least one processor to:
in response to a request to configure the system, open a configuration transaction during runtime of the system among the OPC UA client computer, as the main component, and a data server, a historian, and an acquisition engine, as subordinate components to the OPC UA client computer as main component, to start a configuration function of configuring the data server, the historian, and the acquisition engine during which no new configuration transaction may be opened, enable a plurality of configuration Application Programming Interfaces (APIs) to automatically generate a plurality of configuration files for configuring the data server, the historian, and the acquisition engine of the data system for data collection from data sources in the data system, each configuration file including connection details for the data server, the historian, and the acquisition engine, and structures for the data collection; and
in response to a configuration error in any one of configuration files of the data server, the historian, and the acquisition engine as subordinate components of the system, terminate the configuration transaction with the OPC UA client computer, as the main component, and
in response to no configuration errors in the configuration files, transmit the configuration files to the data server, the historian, and the acquisition engine; and
1-2-2) a configuration cache comprising a storage that stores the plurality of configuration files generated by the plurality of configuration APIs;
2) the historian as a subordinate component of the system, the historian comprising:
a memory storage that stores historical data which comprises process data and data from the plurality of field devices,
at least one memory configured to store computer program code; and
at least one processor configured to access the at least one memory and operate according to the computer program code, said computer program code including:
historian configuration code configured to cause at least one of the at least one processor to receive the transmitted configuration file and update configuration data of the historian according to the received configuration file;
3) the data server, as a subordinate component of the system, accessible by the client computer, the data server comprising:
3-1) a plurality of services configured to receive a request for data access from the client computer, the plurality of services configured to determine which one of a historian data provider or a data source data provider is a data provider to access data in the request for data access, based on information included in or related to the request for data access;
3-2) an address space comprising a plurality of configuration methods, wherein each of the plurality of configuration methods comprises a respective node which comprises customized parameters and at least one predefined service from the plurality of services, wherein at least one parameter of each node defines a storage location for data of the node, and wherein the storage location is at least one of the historian, the one or more OPC DA data sources for providing field device data and a temporary storage in the data server;
at least one memory configured to store computer program code; and
at least one processor configured to access the at least one memory and operate according to the computer program code, said computer program code including:
data server configuration code configured to cause at least one of the at least one processor to receive the transmitted configuration file and update configuration data of the data server according to the received configuration file; and 4) the acquisition engine, as a subordinate component of the system, coupled to the data server, the acquisition engine configured to browse, read, write or update field device data in one or more OPC DA data sources, upon a request from the data server, the acquisition engine comprising;

at least one memory configured to store computer program code; and at least one processor configured to access the at least one memory and operate according to the computer program code, said computer program code including:

acquisition engine configuration code configured to cause at least one of the at least one processor to receive the transmitted configuration file and update configuration data of the acquisition engine according to the received configuration file, wherein in response to the data server, the historian and the acquisition engine, as subordinate components of the system, updating their configuration data according to the received configuration files, the configuration transaction with the OPC UA client computer, as the main component of the system, is completed.

2. The system according to claim 1, wherein the historian data provider is further configured to make an access to the historian and to read, write and update the historical data in the historian when the data server determines that a request for data access is to read, write or update the historical data of a variable in the address space.

3. The system according to claim 1, wherein the data server further comprises:

3-3) a local data provider configured to read cached data in the data server when the data server determines that a request for data access is to read real-time variables.

4. The system according to claim 1, wherein the configuration library code further comprises download tool code configured to cause at least one of the at least one processor to download the plurality of configuration files to the data server.

5. The system according to claim 1, wherein the data server configuration code is configured to cause at least one of the at least one processor to determine whether there is any configuration error in the plurality of configuration files generated by the plurality of configuration APIs and to notify the configuration library code of the determination;

wherein the acquisition engine configuration code is configured to cause at least one of the at least one processor to determine whether there is any configuration error in the plurality of configuration files generated by the plurality of configuration APIs and to notify the configuration library code of the determination;

wherein the configuration library code is further configured to cause at least one of the at least one processors to transmit the plurality of configuration files from the configuration methods to the data server, the historian and the acquisition engine.

6. The system according to claim 1, wherein each of the plurality of configuration Application Programming Interfaces (APIs) is configured to check, based on the request to configure the system, whether a user has a right to perform a configuration function and to allow the configuration function in response to each of the plurality of configuration APIs determining that the user has the right to perform the configuration function.

7. A system comprising:

a data server;

a historian;

an acquisition engine; and a client computer comprising at least one processor configured to:

in response to a request to configure a data system, open a configuration transaction during runtime of the system among the client computer, as a main component of the system, and the data server, the historian, and the acquisition engine, as subordinate components to the client computer as main component, to start a configuration function of configuring the data server, the historian, and the acquisition engine during which no new configuration transaction may be opened, and enable a plurality of configuration APIs;

in response to being enabled, the configuration APIs automatically generate a plurality of configuration files for configuring a data server, a historian, and an acquisition engine of the data system for data collection from data sources in the data system, each configuration file including connection details for the data server, the historian, and the acquisition engine, and structures for the data collection; and in response to a configuration error in any one of the configuration files of the data server, the historian, and the acquisition engine as subordinate components of the system, terminate the configuration transaction with the client computer, and in response to no configuration errors in the configuration files, transmit the generated configuration files to a data server configuration module of the data server, a historian configuration module of the historian, and an acquisition engine configuration module of the acquisition engine using respective configuration methods, wherein in response to receiving the configuration files, the data server configuration module updates configuration data in the data server, the historian configuration module updates configuration data in the historian, and the acquisition engine configuration module updates configuration data in the acquisition configuration engine according to the received configuration files, and the configuration transaction among the client computer, as main component, and the data server, the historian, and the acquisition engine, as subordinate components of the client computer, as main component, is completed.

8. The system of claim 7, wherein the configuration methods validate the configuration files before transmission.

9. The system of claim 7, wherein the structures comprise one or more of address space on the data server, security information, a history of nodes, and scan rate information for the data collection.

* * * * *